United States Patent [19]
Carmichael et al.

[11] 3,722,726
[45] Mar. 27, 1973

[54] NONEVERTING BOTTOM FOR THERMOPLASTIC BOTTLES

[75] Inventors: Keith Stewart Carmichael; Joseph Thomas Lester, Jr., both of Wilmington, Del.

[73] Assignee: E. I. du Pont de Nemours and Company, Wilmington, Del.

[22] Filed: Nov. 1, 1971

[21] Appl. No.: 194,643

[52] U.S. Cl. ................................... 215/1 C, 150/0.5
[51] Int. Cl. ............................................. B65d 1/02
[58] Field of Search ..................... 215/1 C; 150/0.5

[56] References Cited

UNITED STATES PATENTS 3,511,401  7/1968  Lachner............................215/1 C

*Primary Examiner*—Donald F. Norton
*Attorney*—Louis Del Vecchio

[57] ABSTRACT

A generally cylindrical thermoplastic bottle for bottling liquids under pressure such as beer, soda and aerosols, having a noneverting bottom under conditions of bottling and use. The bottom is a shell having a configuration consisting essentially of a series of geometric curves rotationally symmetrical about the central axis of the bottle starting at the generally right cylinder section with an ogive extending toward the bottom of the bottle connected to a toroid that forms the seat of the bottle and turns upward into the interior of the bottle connected to a straight line angled towards the center of the bottle forming a re-entrant cone that is connected to a recessed toroid that turns away from the interior of the bottle ending in a straight line perpendicular to the central axis of the bottle forming a recessed disc in the bottom of the bottle. Alternatively, the bottom geometry can be modified by expanding the recessed toroid and adding a reinforcing ring of polymer on the interior of the recessed toroid.

7 Claims, 4 Drawing Figures

PATENTED MAR 27 1973

INVENTOR
JOSEPH THOMAS LESTER, JR.
KEITH STEWART CARMICHAEL
BY
ATTORNEY

INVENTORS
JOSEPH THOMAS LESTER, JR.
KEITH STEWART CARMICHAEL

ATTORNEY

NONEVERTING BOTTOM FOR THERMOPLASTIC BOTTLES

BACKGROUND OF THE INVENTION

This invention relates to the art of manufacturing thermoplastic bottles useful in bottling liquids under pressure such as sodas, beer and aerosols and is particularly concerned with providing a bottle having a bottom that will not evert during use.

It is known that thermoplastic bottles can be used to bottle beverages for consumer use. If the bottle is used to contain carbonated beverages such as soda or beer, the bottle must be designed to constrain the autogenous pressure in the bottle while remaining dimensionally stable in shape and volume.

Thermoplastics, however, by nature will deform at moderate temperatures under relatively small loads and therefore, when formed into plastic bottles and used in bottling liquids under pressure, they will deform in normal use. For example, at a temperature of about 40° C. and under an autogenous pressure of about 100 psi, i.e., about the highest pressure typically found in a soda or beer bottle, plastic bottles have a tendency to deform into the shape of a sphere. One way of significantly reducing this tendency is to make the shell of the bottle very thick. While functional, this is not economical and, furthermore, tends to make the bottle so rigid that it fractures in normal use. It has been found, however, that by making a thin-shelled bottle and molecularly orienting the polymer, the yield stress in the side walls can be improved sufficiently to resist this tendency to deform. However, it is very difficult to molecularly orient the polymer in the bottom of the bottle. Therefore, the bottom retains this tendency to deform, i.e., evert.

In general, the bottom of a bottle is conventionally rather flat, permitting the bottle to stand upright. In unpressurized applications, this is not a severe requirement and flat-bottomed bottles can be used successfully. In pressurized applications, however, a flat bottom is inherently a poor shape to hold rigid and the bottom tends to evert into the shape of a hemisphere, increasing the volume of the bottle, distorting the bottom shape and eliminating the possibility of the bottle being able to stand on a flat surface. Therefore, the low stress capabilities of the plastic coupled with high temperatures for extended time periods under sufficient internal pressure, will cause the plastic to creep or deform so that shape and volume change excessively even though the contents, i.e., gas and the liquid, are successfully contained within the bottle.

Therefore, it is desirable to find a way of making a plastic bottle useful in bottling liquids under pressure having a bottom that will not evert and will, at the same time, maintain a base sufficient for the bottle to stand on when used to bottle liquids under pressure.

SUMMARY OF THE INVENTION

Accordingly, the present invention provides a thermoplastic bottle having a noneverting bottom when subjected to temperatures up to about 40° C. and autogenous pressures up to about 100 psig. The bottle is a generally cylindrical, biaxially oriented, thermoplastic bottle having a shell thickness at the right cylinder section of at least about 15 mils and at least about 30 mils in the bottom section. The bottle is preferably prepared from a polymer having a modulus of elasticity at yield of at least 180,000 psi; a tensile strength of at least 5,000 psi; a Poisson's Ratio of 0.35 to 0.4; and a deformation constant equal to the slope of the log (reciprocal of the strain rate) versus strain having a value of at least about 0.65.

Accordingly, it has been found that by structurally designing the bottom of a plastic bottle in a specific manner the bottom will not evert and a sufficient standing base results. The structural design is best described as a series of connected geometric curves rotationally symmetrical around the center line of the bottle starting with a. about a 20° to 50° arc of a circle concaved inwardly having a radius of 0.5D up to about 1.5D with the center of the circle along an imaginary line perpendicular to the central axis of the bottle where the generally right cylindrical section of the bottle joins the bottom section of the bottle forming a generally ogival curve connected at one end to the generally right cylindrical section of the bottle extending downward to the bottom seating area of the bottle connected to b. one end of a 100° to 160° arc of a circle concaved inwardly with its center of curvature along an imaginary line perpendicular to a tangent to the ogive at the point where the ogive is connected to this circle having a radius of about 0.02–0.05D forming an annular toroidal knuckle which is the seat of the bottle that is connected to c. one end of a straight line having a length of about 0.1–0.2D directed at an angle toward the central axis of the bottle forming a truncated re-entrant cone section having a half cone angle of about 0° to 30° connected to d. one end of a 100° to 180° arc of a circle with its center of curvature along an imaginary line perpendicular to the straight line of (c) above at the point where the straight line is connected to this circle having a radius of about 0.02–0.05D forming a recessed annular knuckle turning away from the interior of the bottle connected to e. a straight line which extends in a perpendicular direction toward the central axis of the bottle forming a recessed disc in the bottom center of the bottle and the distance between the central axis of the bottle and the center of the 100° to 160° portion of a circle forming the annular toroidal seating knuckle is 0.2–0.35D where D is the outside diameter of the bottle.

In alternate embodiments, the bottom geometry can be modified by (a) expanding the dimensions of the recessed toroidal knuckle by adding straight sections in the curve itself or at either end of the curved section for ease in forming the recessed toroidal knuckle and to increase the bottle seating area; and/or (b) adding a reinforcing ring of polymer to the top inside portion of the recessed toroidal knuckle projecting into the interior of the bottle increasing the eversion resistance of the bottom of the bottle.

DETAILS OF THE INVENTION

Figure 1:
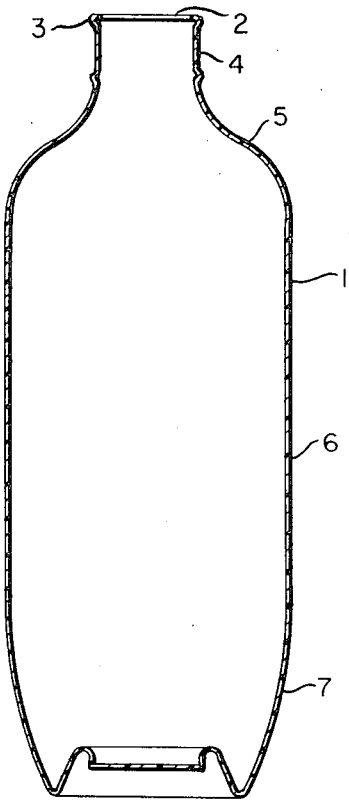
FIG. 1 is a cross section of the preferred bottle of the present invention.

FIG. 1 shows a front view of a thermoplastic bottle incorporating the noneverting bottom design of the present invention. The bottle 1 is a hollow container having an opening 2 at one end used to pour liquid into or out of the bottle. The bottle is made up of a lip portion 3 surrounding opening 2, a narrow, generally cylindrical neck section 4, a cone frustum section 5, a large, generally cylindrical section 6 and a noneverting bottom section 7 which will be described below in detail. The upper configuration of the bottle is not critical to this invention. For example, the neck portion can be short with a definite shoulder in the bottle or elongated with a smooth transition into the generally cylindrical portion of the bottle. The main portion of the bottle, namely, the generally cylindrical section, can be fluted or otherwise shaped to obtain a desirably aesthetic appearance.

The term "evert" is used in its common sense, i.e., to turn outward; and a bottle having a noneverting bottom is used to mean a bottle in which the bottom will not turn outward under normal use conditions to a point where it is unsightly or would not stand. Normal use conditions are generally no greater than a temperature of about 0°–40° C. and an autogenous, i.e., internal positive, pressure up to about 100 psig. It is to be understood that under an autogenous pressure some movement, usually nominal elongation, will occur that is not eversion.

Eversion can be caused by a number of factors. Perhaps the two most important factors are (a) overstressing of the plastic material used to make the bottle, particularly where the internal pressure of the bottle causes stresses in the bottle that exceed the yield stress of the material resulting in large material deflections and deformations; and (b) geometric instability. The noneverting bottle of the present invention balances the type and amount of thermoplastic material used with a particular geometric design to the bottom of the bottle.

The preferred bottom geometry of the bottle will now be described in relation to FIG. 2 of the drawings. In describing the bottom geometry and as hereinafter used, D equals the outside diameter of the bottle taken perpendicular to the major axis of the bottle (an imaginary line running from top center to bottom center) where the bottom section of the bottle meets the generally cylindrical section of the bottle. All dimensions are outside dimensions, i.e., mold dimensions.

The structural design is a series of geometric curves rotationally symmetrical around the center line of the bottle starting with a. about a 20° to 50° arc $A_1$ of a circle 8 concaved inwardly having a radius $R_1$ of 0.5D up to about 1.5D with the center of the circle along an imaginary line 9 perpendicular to the central axis 10 of the bottle where the generally right cylindrical section 6 of the bottle joins the bottom section 7 of the bottle at location 11 forming a generally ogival curve connected at one end 11 to the generally right cylindrical section 6 of the bottle extending downward to the bottom seating area of the bottle connected to b. one end 12 of a 100° to 160° arc $A_2$ of a circle 13 concaved inwardly with its center of curvature along an imaginary line 14 perpendicular to a tangent to the ogive at the point 12 where the ogive is connected to this circle having a radius $R_2$ of about 0.02–0.05D forming an annular toroidal knuckle which is the seat of the bottle that is connected to c. one end 15 of a straight line 16 having a length $L_1$ of about 0.1–0.2D directed at an angle toward the central axis of the bottle forming a truncated reentrant cone section having a half cone angle $a_1$ of about 0° to 30° connected to d. one end 17 of a 100° to 180° arc $A_3$ of a circle with its center of curvature along an imaginary line 18 perpendicular to the straight line 16 of (c) above at the point where the straight line is connected to this circle having a radius $R_3$ of about 0.02–0.05D forming a recessed annular knuckle turning away from the interior of the bottle connected to e. a substantially straight line 19 having a length $L_2$ which extends in a perpendicular direction toward the central axis of 10 of the bottle forming a recessed disc in the bottom center of the bottle and the distance $L_3$ between the central axis of the bottle 10 and the center of the 100° to 160° portion of a circle forming the annular toroidal seating knuckle 13 is 0.2–0.35D where D is the outside diameter of the bottle.

Figure 2:
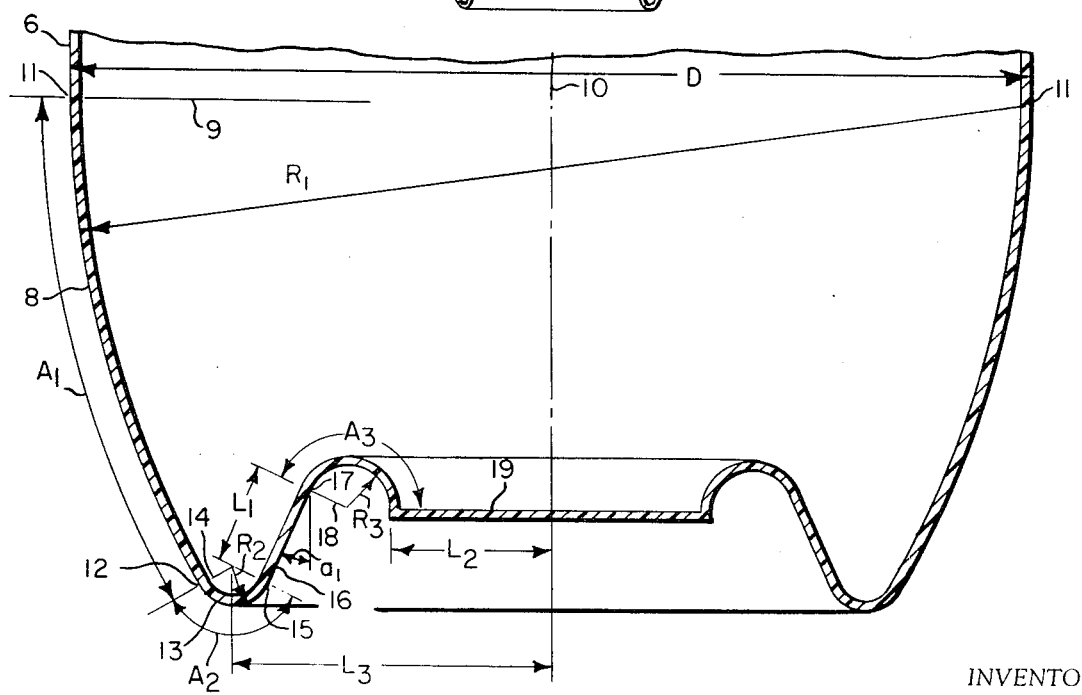
FIG. 2 is an enlarged cross section of the bottom of the bottle shown in FIG. 1.
Figure 3:
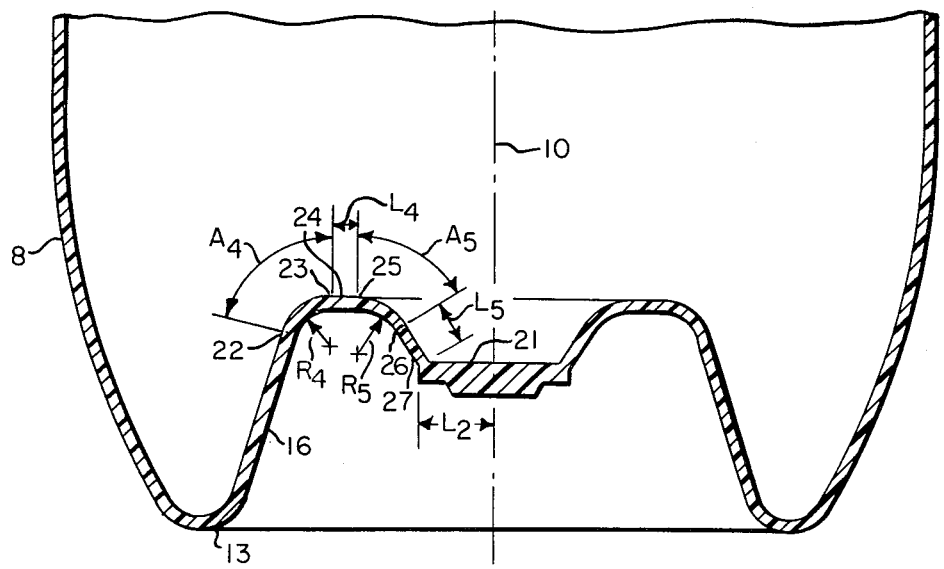
FIG. 3 is a cross section of a bottom of a bottle modified to show the expanded recessed toroidal knuckle.

To particularly illustrate this invention, typical bottles having the same shape as shown in the drawings FIGS. 1 and 2 with a liquid capacity of about 10 ounces can be made using the following dimensions. The shell thickness is about 30 mils except for the bottom portion where the shell thickness is about 50 mils. The actual mold dimensions are:

$D = 2.27$ inches
$R_1 = 2.27$ inches
$R_2 = 0.09$ inch
$R_3 = 0.120$ inch
$A_1 = 30.23°$
$A_2 = 127.3°$
$A_3 = 157.5°$
$a_1 = 22.5°$
$L_1 = 0.320$ inch
$L_2 = 0.343$ inch
$L_3 = 0.75$ inch FIG. 3 shows an alternate embodiment of the present invention. It is the same geometric design as shown in FIGS. 1 and 2 except that the recessed toroidal knuckle is expanded and the recessed central disc portion of the bottle is modified to include the addition of more polymer by thickening the central disc. The modified central disc is indicated by numeral 21.

Referring to FIG. 3, the expanded, recessed toroidal knuckle providing the transition between the straight line section 16 forming the re-entrant cone and the recessed central disc 21 in the bottom of the bottle now consists essentially of a. a 60° to 90° arc $A_4$ of a circle connected at one end 22 to the straight line section 16 forming the re-entrant cone and extending into the interior of the bottle, said arc having its center of curvature along an imaginary line that is perpendicular to the straight line section 16 at the position where the straight line and this arc connect, with a radius $R_4$ of about 0.02 to 0.05D connected to b. one end 23 of a straight line section 24 perpendicular to and directed towards the central axis 10 of the bottle with a length $L_4$ no greater than 0.15D connected to c. a 45° to 90° arc $A_5$ of a circle connected at one end 25 to the straight line section 24 extending away from the interior of the bottle, said arc having a radius $R_5$ of about 0.02 to 0.05D with its center of curvature along an imaginary line that is perpendicular to line 24 at the location where line 24 joins this arc $A_5$, connected to d. one end 26 of a straight line section 27 having a length $L_5$ no greater than 0.1D.

The straight line sections in the recessed toroidal knuckle improve the ease of forming the knuckle and increase the bottom seating area, i.e., the distance between the central axis of the bottle and the seating knuckle.

To particularly illustrate this alternate embodiment, typical bottles having the same shape as the bottle of FIG. 1 can be made with the exception that the bottom of the bottle has the configuration as shown in FIG. 3. The shell thickness is about 30 mils in the generally right cylindrical section and 50 mils in the bottom section. Each bottle has a liquid capacity of about 10 ounces.

Figure 4:
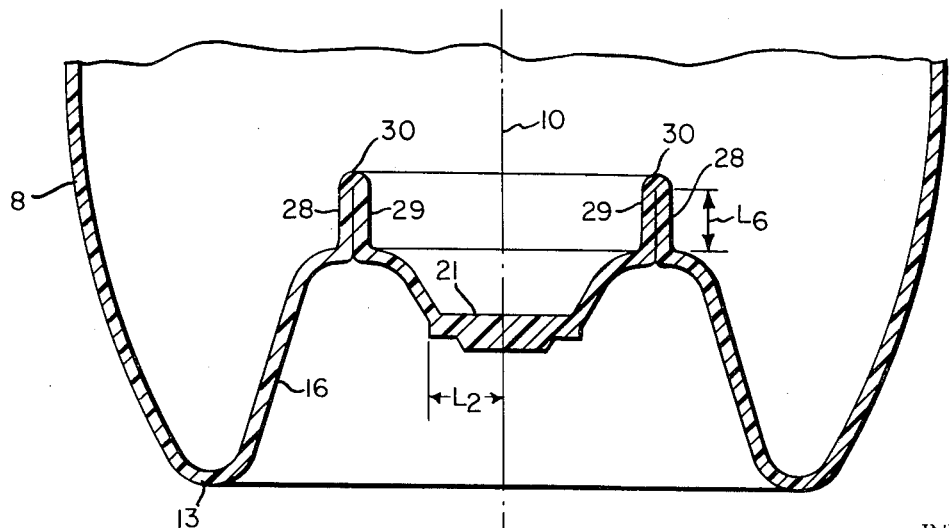
FIG. 4 is a cross section of a bottom of a bottle modified to show the reinforcing ring of polymer on the interior portion of the recessed toroidal knuckle.

$R_1 = 2.27$ inches
$R_2 = 0.09$ inch
$R_4 = 0.01$ inch
$R_5 = 0.10$ inch
$A_1 = 30.23°$
$A_2 = 127.3°$
$A_4 = 70°$
$A_5 = 90°$
$a_1 = 20°$
$L_1 = 0.252$ inch
$L_2 = 0.343$ inch
$L_3 = 0.75$ inch
$L_4 = 0.028$ inch
$L_5 = 0.05$ inch
$D = 2.27$ inch FIG. 4 shows still another alternate embodiment of the present invention. It is the same geometric design as shown in FIG. 3 except that the recessed toroidal knuckle is formed with a reinforcing ring of polymer appended from the top section of the knuckle projecting into the interior of the bottle. This reinforcing ring can also be formed on the recessed toroidal knuckle of the embodiment shown in FIGS. 1 and 2.

The reinforcing ring consists essentially of two concentric contacting side walls 28 and 29 having a length $L_6$ of about 0.05–0.20D joined by a toroidal knuckle 30.

A typical bottle incorporating the reinforcing ring can be made with the same bottle dimensions described above for either the embodiment shown in FIGS. 1 and 2 or the embodiment shown in FIG. 3. The reinforcing ring will have a length $L_6$ of about 0.1 inch and the concentric side walls are connected by a 180° toroidal knuckle. It has been found that bottles incorporating a reinforcing ring exhibit at least about a 50 percent improvement in the amount of autogenous pressure that the bottle can contain compared to a similar bottle that does not incorporate the reinforcing ring.

Bottles prepared according to the present invention exhibit excellent column strength, constant volume even under pressure with excellent stability whether empty or full.

Thermoplastics useful in preparing bottles having a bottom designed according to the present invention are polyethylene terephthalate, acrylonitrile/styrene/methyl acrylate copolymer, acrylonitrile/ethylene/methyl acrylate copolymer, methacrylonitrile copolymers, polycarbonates, polysulfones, polybis(p-aminocyclohexyl)-dodecaneamide or polyformaldehyde resin. Polyethylene terephthalate is preferred because of its excellent strength properties, particularly a high tensile strength, excellent impact strength and relatively low creep.

Polyethylene terephthalate useful in preparing the thermoplastic articles of this invention includes (a) polymers wherein at least about 97 percent of the polymer contains the repeating ethylene terephthalate units of the formula:

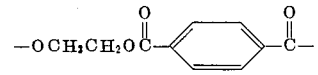

with the remainder being minor amounts of ester-forming components, and (b) copolymers of ethylene terephthalate wherein up to about 10 mole percent of the copolymer is derived from other ester-forming components which are substituted for corresponding amounts of the usual glycol and/or the carboxylic reactants. Other ester-forming components include the monomer units of diethylene glycol; propane-1,3-diol; butane-1,4-diol; polytetramethylene glycol; polyethylene glycol; polypropylene glycol; 1,4-hydroxymethylcyclohexane and the like; or isophthalic, bibenzoic, naphthalene 1,4- or 2,6-carboxylic, adipic, sebacic, decane-1,10-dicarboxylic acid, and the like.

The specific limits on the comonomer are governed by the glass transition temperature of the polymer. It has been found that when the glass transition temperature extends below about 50° C., a copolymer having reduced mechanical properties results. Accordingly, this corresponds to the addition of no more than about 10 mole percent of a comonomer. One exception to this, for example, is the addition of bibenzoic acid where the glass transition temperature of the copolymer remains above 50° C. and does not drop with the addition of more than 10 mole percent. Others would be obvious to those skilled in the art.

In addition, the polyethylene terephthalate polymer can include various additives that do not adversely affect the polymer in use such as stabilizers, e.g., antioxidants or ultraviolet light screening agents, extrusion aids, additives designed to make the polymer more degradable or combustible, such as oxidation catalysts, as well as dyes or pigments.

The polyethylene terephthalate should have an inherent viscosity (1 percent concentration of polymer in a 37.5/62.5 weight percent solution of tetrachloroethane/phenol, respectively, at 30° C.) of at least 0.55 to obtain the desired end properties in the articles formed and preferably the inherent viscosity is at least about 0.7 to obtain an article having excellent toughness properties, i.e., resistance to impact loading. The viscosity of the polymer solution is measured relative to that of the solvent alone and the $$\text{Inherent viscosity} = \frac{\text{natural logarithm} \frac{\text{viscosity of solution}}{\text{viscosity of solvent}}}{C}$$

where C is the concentration expressed in grams of polymer per 100 milliliters of solution.

In the preferred embodiment wherein the thermoplastic is polyethylene terephthalate, the plastic bottle preferably has a shell thickness in the right cylinder section of at least about 20 mils and at least about 30 mils in the bottom section with at least the following characteristics, particularly in the bottom portion of the bottle:

a. a modulus of elasticity at yield of at least about 180,000 psi;
b. a tensile strength at break of at least 5,000 psi;
c. a Poisson's Ratio of 0.35 to 0.4; and
d. a deformation constant equal to the slope of the log (reciprocal of the strain rate) versus strain having a value of at least about 0.65.

The modulus of elasticity at yield is the ratio of stress to strain of a specimen in tension wherein the tensile yield stress is that stress at which the specimen begins to stretch without an increase in load. The modulus of elasticity at yield is determined by ASTM D-882, Tensile Properties of Thin Plastic Sheeting.

The tensile strength at break is also determined by ASTM D-882 wherein a specimen is placed under increasing tension until it breaks.

The deformation constant is a measure of creep. Creep is usually measured on polymers by placing a sample under a fixed load, i.e., stress, at a constant temperature and measuring the strain deformation as a function of time. The curves for thermoplastics have a characteristic shape in which the rate of strain decreases as a function of time. A plot of the log (reciprocal of the strain rate) versus strain results in a linear plot over a substantial part of the creep curve. The slope of the straight line segment herein referred to as the deformation constant, is mathematically expressed as:

$$DC = \frac{d \log (dt/d\epsilon)}{d\epsilon}$$

where
$DC$ = deformation constant,
$dt$ = differential of time, and
$d\epsilon$ = differential of the strain.

This deformation constant is applicable to related thermoplastics and can be used to compare the creep behavior by comparing the slope values. A deformation constant equal to 0 indicates that the sample being tested is extending at its natural strain rate or for the load indicated, the strain rate is constant. A deformation constant of infinity indicates that there is no measurable strain indicated.

For bottles prepared from polyethylene terephthalate according to the preferred embodiment of the present invention, the deformation constant is at least about 0.65, indicating a deformation of less than 5 percent in 100 hours at 50° C. with an autogenous pressure of 75 psig.

The preferred plastic bottle has a shell thickness that is primarily dependent on (a) the size of the bottle being made with particular consideration given to the liquid capacity and the diameter of the bottle along with (b) the use intended for the bottle particularly considering the autogenous pressure developed during use.

Bottles intended for use in containing pressures up to about 100 psig. at a temperature of about 40° C. have typical shell thicknesses in accordance with the following design sizes. Bottles having a fluid capacity of about 6 to 16 fluid ounces and a diameter in the generally right cylindrical section of about 2 to 2.5 inches have a shell thickness in the right cylindrical section of at least about 15 mils, and a thickness of at least about 45 mils and preferably 50 mils in the bottom section. Bottles having a fluid capacity of greater than 16 ounces and up to about 32 ounces and a diameter of about 3 to 4 inches have a shell thickness in the right cylindrical section of at least about 30 mils and a thickness of at least about 60 mils in the bottom section.

In the event that the bottles will be used in applications where the autogenous pressure will be something different than 100 psig. at 40° C., the thickness of the shell can then be adjusted to meet the specific pressure demands. In general, increased pressures will require an increased shell thickness, and a decreased shell thickness can be used with decreased pressures. The specific suitable thickness can be determined experimentally or mathematically using known pressure vessel technology.

A preferred process for preparing bottles having the bottom geometry designed according to the present invention is disclosed in U.S. Patent application Ser. No. 93,571, filed Nov. 30, 1970, hereby incorporated by reference. The process produces a hollow, biaxially oriented, thermoplastic article by extruding a hollow, cylindrical, thermoplastic slug with a ramrod through an annular orifice into a slidable mold at a temperature within its molecular orientation range to a shape relatively larger than the original shape of the slug. The annular orifice is formed by the extrusion barrel which is the cylinder through which the slug is being ramrodded, and an opposing mandrel. The mold has an annular bead recess at one end to accept and hold one end of the extrudate while simultaneously drawing the extrudate in the direction of extrusion and expanding the extrudate by forcing a gas or liquid against the interior portions of the extrudate, expanding the extrudate to conform to the mold while sliding the mold past the extrusion orifice as continuous extrusion takes place. The reinforcing ring, as shown in FIG. 4, is conveniently formed by continuing to extrude polymer after the sliding mold has come to a stop forcing polymer up and around the mandrel that forms part of the extrusion orifice. The extra polymer needed to form the reinforcing ring can be supplied by using a slightly longer slug.

It will be appreciated that other processes can be used to reproduce a bottle having a bottom geometry in accordance with the design of the present invention.

The bottom design of the present invention can be used on various types or sizes of plastic bottles and can be used in pressurized or unpressurized applications. However, it finds particular use in bottling liquids under pressure such as soda or beer in typically sized bottles, such as 6-ounce, 8-ounce, 10-ounce, 12-ounce, and 16-ounce bottles.

We claim:

1. In a generally cylindrical thermoplastic bottle, biaxially oriented at least in the generally cylindrical section, the improvement wherein the bottom configuration consists essentially of a series of connected geometric curves rotationally symmetrical around the center line of the bottle starting with
   a. about a 20° to 50° arc of a circle concaved inwardly having a radius of 0.5D up to about 1.5D with the center of the circle along an imaginary line perpendicular to the central axis of the bottle where the generally right cylindrical section of the bottle joins the bottom section of the bottle forming a generally ogival curve connected at one end to the generally right cylindrical section of the bottle extending downward to the bottom seating area of the bottle connected to
   b. one end of a 100° to 160° arc of a circle concaved inwardly with its center of curvature along an imaginary line perpendicular to a tangent to the ogive at the point where the ogive is connected to this circle having a radius of about 0.02–0.05D forming an annular toroidal knuckle which is the seat of the bottle that is connected to
   c. one end of a straight line having a length of about 0.1–0.2D directed at an angle toward the central axis of the bottle forming a truncated re-entrant cone section having a half cone angle of about 0° to 30° connected to
   d. one end of a 100° to 180° arc of a circle with its center of curvature along an imaginary line perpendicular to the straight line of (c) above at the point where the straight line is connected to this circle having a radius of about 0.02–0.05D forming a recessed annular knuckle turning away from the interior of the bottle connected to
   e. a straight line having a length which extends in a perpendicular direction toward the central axis of the bottle forming a recessed disc in the bottom center of the bottle and the distance between the central axis of the bottle and the center of the 100° to 160° portion of a circle forming the annular toroidal seating knuckle is 0.2–0.35D where D is the outside diameter of the bottle.

2. The bottle of claim 1 including a reinforcing ring formed into and appended to the top interior portion of the recessed annular toroidal knuckle of claim 1 (d) and extends into the interior of the bottle wherein the reinforcing ring is two concentric contacting side walls having a length of about 0.05–0.20D joined by a toroidal knuckle.

3. The bottle of claim 1 prepared from polyethylene terephthalate having an inherent viscosity of at least 0.55; a modulus of elasticity at yield of at least 180,000 psi.; a tensile strength of at least 5,000 psi.; a Poisson's ratio of about 0.35–0.4; and a deformation constant equal to the slope of the log (reciprocal of the strain rate) versus strain having a value of at least about 0.65.

4. The bottle of claim 3 having a fluid capacity of about 6 to 16 ounces, a diameter in the generally right cylindrical section of about 2 to 2.5 inches, and a shell thickness in the generally right cylindrical section of at least about 15 mils with a thickness of at least about 45 mils in the bottom section.

5. The bottle of claim 3 having a fluid capacity greater than 16 ounces up to about 32 ounces, a diameter in the generally right cylindrical section of about 3 to 4 inches and a shell thickness in the generally right cylindrical section of at least about 30 mils with a thickness of at least about 60 mils in the bottom section.

6. The bottle of claim 1 wherein the recessed toroidal knuckle of claim 1 (d) is modified to consist essentially of
   a. a 60° to 90° arc of a circle connected at one end to the straight line section forming the re-entrant cone and extending into the interior of the bottle, said arc having its center of curvature along an imaginary line that is perpendicular to the straight line section at the position where the straight line and this arc connect, with a radius of about 0.02 to 0.05D connected to
   b. one end of a straight line section perpendicular to and directed towards the central axis of the bottle with a length no greater than 0.15D connected to
   c. a 45° to 90° arc of a circle connected at one end to the straight line section extending away from the interior of the bottle, said arc having a radius of about 0.02 to 0.05D with its center of curvature along an imaginary line that is perpendicular to the straight line section of (b) above at the location where said line joins this arc, connected to
   d. one end of a straight line section having a length no greater than 0.1D.

7. The bottle of claim 6 having a reinforcing ring formed into the top portion of the expanded recessed toroidal knuckle appended from the straight line section of claim 6 (b) said reinforcing ring consisting essentially of two concentric contacting side walls having a length of about 0.05–0.20D joined by a toroidal knuckle and extending into the interior of the bottle.

* * * * *